US012798420B2

(12) United States Patent
Obayashi et al.

(10) Patent No.: US 12,798,420 B2
(45) Date of Patent: Nov. 17, 2026

(54) COIL POSITION ESTIMATING APPARATUS AND VEHICLE CONTROL APPARATUS

(71) Applicant: DENSO CORPORATION, Kariya-city (JP)

(72) Inventors: Kazuyoshi Obayashi, Kariya-city (JP); Nobuhisa Yamaguchi, Kariya-city (JP); Keisuke Tani, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 9 days.

(21) Appl. No.: 19/004,801

(22) Filed: Dec. 30, 2024

(65) Prior Publication Data

US 2025/0135933 A1 May 1, 2025

Related U.S. Application Data

(63) Continuation of application No. PCT/JP2023/023307, filed on Jun. 23, 2023.

(30) Foreign Application Priority Data

Jul. 4, 2022 (JP) ................................ 2022-107425

(51) Int. Cl.
*B60L 53/12* (2019.01)
*B60L 53/36* (2019.01)
(Continued)

(52) U.S. Cl.
CPC ............... *B60L 53/36* (2019.02); *B60L 53/12* (2019.02); *H02J 50/12* (2016.02); *H02J 50/40* (2016.02); *H02J 50/90* (2016.02)

(58) Field of Classification Search
CPC ...... B60L 53/36; B60L 53/12; B60L 2250/16; B60L 53/122; B60L 53/126; B60L 53/39; B60L 53/38; H02J 50/12; H02J 50/40; H02J 50/90; H02J 2105/37; H02J 7/80; Y02T 10/70; Y02T 10/7072; B60M 7/00
See application file for complete search history.

(56) References Cited

U.S. PATENT DOCUMENTS 12,191,682 B2 * 1/2025 Matsushita ............. H02J 50/90
2014/0333128 A1 * 11/2014 Ichikawa ............ B60L 15/2009 307/9.1

(Continued)

FOREIGN PATENT DOCUMENTS

JP 2013-051744 A 3/2013
JP 2021-079716 A 5/2021

*Primary Examiner* — Robert T Primary Nguyen
(74) *Attorney, Agent, or Firm* — Oliff PLC

(57) ABSTRACT

In a coil position estimating apparatus, a past local-maximum position identifier identifies, from information indicative of how levels of first power received by a power receiving apparatus in the past change over time, at least one local maximum position along a road at which the received power became locally maximum in the past. A power-transmission coil position estimator estimates, based on the identified at least one local maximum position, at least one future local-maximum position as the position of the at least one power transmission coil. The at least one future local-maximum position corresponds to a level of second power to be received by the power receiving apparatus in a forward section of the road from the vehicle; the level of the second power is likely to become locally maximum.

10 Claims, 14 Drawing Sheets

(51) Int. Cl.
*H02J 50/12* (2016.01)
*H02J 50/40* (2016.01)
*H02J 50/90* (2016.01)

(56) References Cited

U.S. PATENT DOCUMENTS

| | | | | |
|---|---|---|---|---|
| 2016/0023557 | A1 | 1/2016 | Dimke et al. | |
| 2016/0033288 | A1 | 2/2016 | Ueda | |
| 2019/0097471 | A1 | 3/2019 | Pantic et al. | |
| 2021/0162986 | A1* | 6/2021 | Sakai | B60K 35/22 |
| 2021/0291684 | A1 | 9/2021 | Takahashi et al. | |
| 2022/0410732 | A1* | 12/2022 | Yokoyama | B60L 53/12 |
| 2023/0088727 | A1* | 3/2023 | Seong | B60L 53/126<br>320/108 |
| 2025/0273963 | A1* | 8/2025 | Kajita | B60L 53/68 |

* cited by examiner

FIG.7 d1

| DISTANCE (m) | RECEIVED POWER (W) |
|---|---|
| −0.1 | 19.2 |
| −0.2 | 20.0 |
| −0.3 | 18.0 |
| −0.4 | 16.0 |
| −0.5 | 16.0 |
| −0.6 | 18.0 |
| −0.7 | 19.5 |
| −0.8 | 17.9 |
| −0.9 | 16.2 |
| −1.0 | 16.1 |
| −1.1 | 18.1 |
| −1.2 | 20.2 |
| −1.3 | 18.5 |
| −1.4 | 17.1 |
| −1.5 | 16.2 |
| −1.6 | 18.5 |
| −1.7 | 19.9 |
| −1.8 | 18.8 |
| ··· | ··· |

d2

| No. | PAST POSITION (m) |
|---|---|
| B1 | −0.2 |
| B2 | −0.7 |
| B3 | −1.2 |
| B4 | −1.7 |

d3

| No. | FUTURE POSITION (m) |
|---|---|
| N1 | 0.3 |
| N2 | 0.8 |
| N3 | 1.3 |
| N4 | 1.8 |
| N5 | 2.3 |
| N6 | 2.8 |
| N7 | 3.3 |

SECOND EMBODIMENT

THIRD EMBODIMENT

THIRD EMBODIMENT

FOURTH EMBODIMENT

COIL POSITION ESTIMATING APPARATUS AND VEHICLE CONTROL APPARATUS

CROSS-REFERENCE TO RELATED APPLICATION

This application is a bypass continuation application of currently pending international application No. PCT/JP2023/023307 filed on Jun. 23, 2023 designating the United States of America, the entire disclosure of which is incorporated herein by reference, the international application being based on and claiming the benefit of priority from Japanese Patent Application No. 2022-107425 filed on Jul. 4, 2022, the disclosure of which is incorporated herein by reference.

TECHNICAL FIELD

The present disclosure relates to coil position estimating apparatuses and vehicle control apparatuses.

BACKGROUND

There are well-known various systems, each of which is configured such that a power transmission apparatus, which includes power transmission coils mounted to a road, wirelessly supplies power to an electric vehicle equipped with a power receiving apparatus that includes a power receiving coil.

A wireless power transmission system disclosed in Japanese Patent Application Publication No. 2013-51744 includes a plurality of primary coil sections L, each of which is comprised of a plurality of coils C1 to C6; the primary coil sections L are mounted on a road while being arranged along the road at regular intervals. When a charging secondary coil 4 of a power receiving apparatus installed in a vehicle 2 is magnetically coupled with a selected primary coil section L, the charging secondary coil 4 and the selected primary coil section L perform magnetic resonance with each other. This results in an electromotive force being induced in the charging secondary coil 4, and the electromotive force charges a battery 6 of the vehicle 2.

SUMMARY

In such a wireless transfer system, while an electric vehicle is stopped, the position of each power transmission coil and the position of the power receiving coil do not change. This may therefore result in power-transfer efficiency between the power transmission apparatus and the power receiving apparatus becoming extremely deteriorated if the power transmission coils have an improper positional relationship with the power receiving coil.

The wireless power transfer system disclosed in the above patent publication performs autonomous control that causes a selected primary coil section L of the power transmission apparatus and the secondary coil 4 of the power receiving apparatus to transmit positioning signals to one another to accordingly cause the secondary coil 4 to face the selected primary coil section L. Unfortunately, the configuration of the wireless power transfer system disclosed in the above patent publication may require equipment to be installed in the power transmission apparatus and the power receiving apparatus, which cause the positioning signals to be transmitted to one another. This may result in cost increases in the wireless power transfer system disclosed in the above patent publication.

Additionally, it is desired for manual driving except for autonomous driving to determine the position of each power transmission coil. This enables a driver to manually stop a vehicle at a selected position where it is possible to improve the power transfer efficiency between the power receiving apparatus of the vehicle and a selected one of the power transmission coils.

Accordingly, development of a technology is desired; the technology can estimate a position of a power transmission coil with a higher accuracy while suppressing cost increases.

A coil position estimating apparatus is used to be installed in a vehicle together with a power receiving apparatus to which power is wirelessly suppliable from a power transmission apparatus that includes one or more power transmission coils mounted to a road. The coil position estimating apparatus is configured to estimate a position of at least one power transmission coil. The coil position estimating apparatus includes a past local-maximum position identifier configured to identify, from information indicative of how levels of first power received by the power receiving apparatus in the past change over time, at least one local maximum position along the road at which the received power became locally maximum in the past. The coil position estimating apparatus includes a power-transmission coil position estimator configured to estimate, based on the identified at least one local maximum position, at least one future local-maximum position as the position of the at least one power transmission coil. The at least one future local-maximum position corresponds to a level of second power to be received by the power receiving apparatus in a forward section of the road from the vehicle; the level of the second power is likely to become locally maximum.

The coil position estimating apparatus identifies the at least one local maximum position along the road at which the received power became locally maximum in the past. Then, the coil position estimating apparatus estimates, based on the identified at least one local maximum position, at least one future local-maximum position as the position of the at least one power transmission coil. The at least one future local-maximum position corresponds to the level of the second power to be received by the power receiving apparatus in the forward section of the road from the vehicle; the level of the second power is likely to become locally maximum.

This configuration therefore enables the position of the at least one power transmission coil located in the forward section of the road to be estimated with high accuracy. Additionally, this configuration enables estimation without configurations required to transfer positioning signals between the power receiving coil and the at least one power transmission coil, making it possible to suppress cost increases as compared with configurations that use equipment required to transfer positioning signals between the power receiving coil and the at least one power transmission coil.

BRIEF DESCRIPTION OF THE DRAWINGS

FIG. 7 is a diagram illustrating an example indicative of how the future local-maximum position estimating subroutine works;

DETAILED DESCRIPTION OF EMBODIMENTS

First Embodiment

Configuration of Moving Power Transfer System 1

Figure 1:
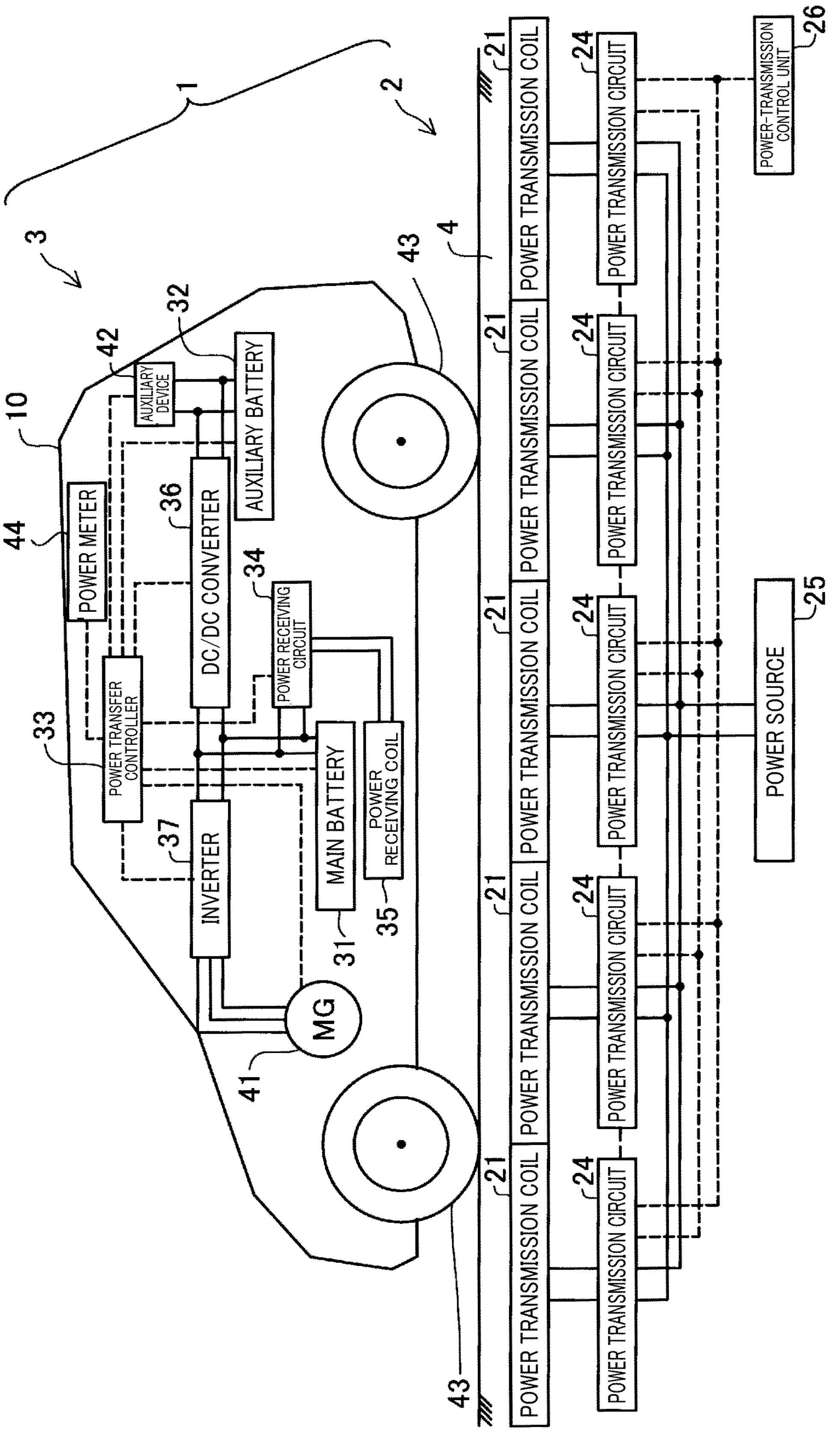
FIG. 1 is a block diagram illustrating a schematic configuration of a moving power transfer system according to the first embodiment of the present disclosure.

Referring to FIG. 1, a moving power transfer system 1 includes a power transmission apparatus 2 mounted to a road 4, and a power receiving apparatus 3 mounted to a vehicle 10. The moving power transfer system 1 is configured such that the power transmission apparatus 2 is capable of wirelessly supplying power to the vehicle 2 that is traveling or stopped. The vehicle 10 is configured as an electric vehicle or a hybrid vehicle. The vehicle 10 will also be referred to as an own vehicle 10

The power transmission apparatus 2 mounted to the road 4 includes a plurality of power transmission coils 21, a plurality of power transmission circuits 24, an external power source 25, which will be simply referred to as a power source 25, and a power-transmission control unit 26. Each of the power transmission circuits 24 is configured to apply an alternating-current (AC) voltage to a corresponding one of the power transmission coils 21 to accordingly supply power to the corresponding one of the power transmission coils 21.

The power transmission coils 21 are arranged in a longitudinal direction of the road 4. The power transmission coils 21 are categorized into plural sectors. How the power transmission coils 21 are mounted to the road 3 will be described later with reference to FIG. 4.

Each of the power transmission circuits 24 is configured to convert a direct-current (DC) voltage supplied from the power source 25 into a high-frequency AC voltage, and apply the converted AC voltage to the corresponding one of the power transmission coils 21. For example, each of the power transmission circuits 24 may be comprised of an inverter, a filter, and a resonance circuit. Because each of the inverter, filter, and resonance circuit is a well-known device, the descriptions of the inverter, filter, and resonance circuit will be omitted in the first embodiment.

The power source 25 is a circuit for supplying the DC voltage. For example, the power source 25 includes a power-factor corrector (PFC), and is configured to receive grid AC power, and transmit the grid AC power through the PFC to each of the power supply circuits 24. The power source 25 can be configured to receive the grid AC power, convert the grid AC power into AC power with 50/60 Hz, and transmit the AC power with 50/60 Hz to each of the power supply circuits 24. Then, each power transmission circuit 24 can be configured to apply a power-factor correction to the received AC power, and convert the AC power subjected to the PFC into DC power. Illustration of the PFC is omitted in FIG. 1. The DC voltage outputted from the power source 25 is not limited to a complete DC voltage with no ripples, and can be a substantially DC voltage with certain levels of ripples.

The power-transmission control unit 26 is configured to control each power transmission circuit 24, so that each power transmission circuit 24 performs a power transmission operation through the corresponding power transmission coil 21.

The vehicle 10 includes a main battery 31, an auxiliary battery 32, a power transfer controller 33, a power receiving circuit 34, a power receiving coil 35, a DC/DC converter 36, an inverter 37, a motor-generator 41, auxiliary devices 42, tires 43, and a power meter 44.

Figure 2:
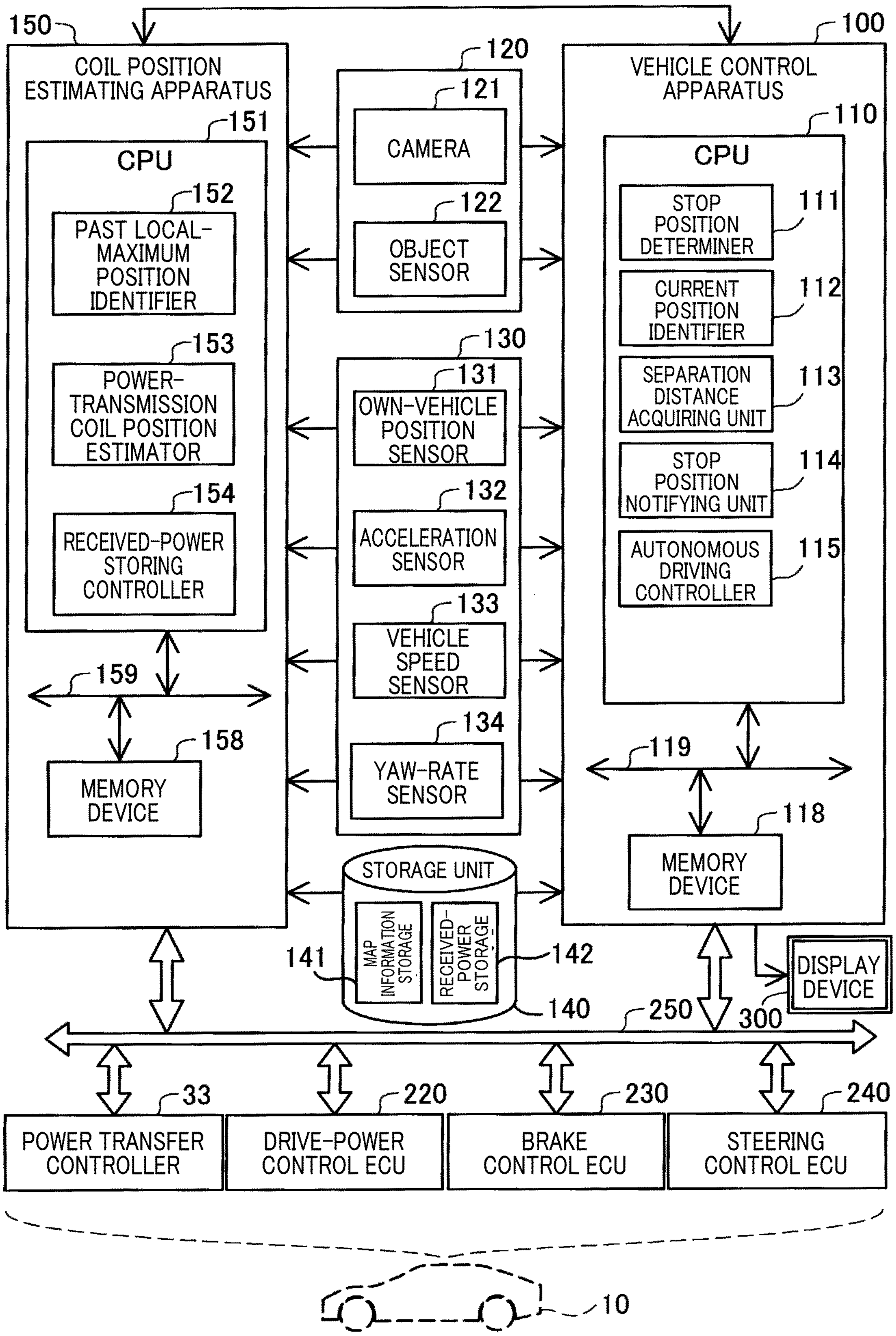
FIG. 2 is a block diagram illustrating a functional configuration of a vehicle according to the first embodiment.

Additionally, the vehicle 10 includes, as illustrated in FIG. 2, a vehicle control apparatus 100, a coil position estimating apparatus 150, surrounding sensors 120, internal sensors 130, a storage unit 140, and various electronic control units (ECUs). These components illustrated in FIG. 2 will be described later with reference to FIG. 2.

The power receiving coil 35 is connected to the power receiving circuit 34, and a pair of output terminals of the power receiving circuit 34 is connected to each of the main battery 31, a pair of high-side terminals of the DC/DC converter 36, and the inverter 37. A pair of low-side terminals of the DC/DC converter 36 is connected to the auxiliary battery 32 and the auxiliary devices 42. Terminals of the motor-generator 41 are connected to the inverter 37. The power receiving coil 35 according to the first embodiment is located under the body of the vehicle 10 and arranged adjacent to the center at which the longitudinal and width directions of the vehicle 10 cross each other. The power receiving coil 35 is configured to receive AC power transmitted from at least one power transmission coil 21.

The power receiving circuit 34 includes a rectifier that converts an AC voltage outputted from the power receiving coil 35 into a DC voltage. The power receiving circuit 34 can include a DC/DC converter that converts the DC voltage generated by the rectifier into a corrected DC voltage that is suitable for charging the main battery 31. The DC voltage outputted from the power receiving circuit 34 can be used to charge the main battery 31 and/or drive the motor-generator 41 through the DC/DC converter 36. The DC/DC converter 36 can be configured to step down the DC volage outputted from the power receiving circuit 34, and the stepped-down DC voltage can be used to charge the auxiliary battery 32 and/or drive the auxiliary devices 42.

The main battery 31 is a secondary battery for outputting a relatively high DC voltage for driving the motor-generator 41.

The motor-generator 41 operates as a three-phase AC motor that generates drive power for causing the vehicle 10 to travel. In addition, the motor-generator 41 operates as a generator that generates a three-phase AC voltage while the vehicle 10 is decelerating.

The inverter 37 is configured to convert the DC voltage outputted from the main battery 31 into the three-phase AC voltage when the motor-generator 41 serves as a three-phase AC motor, thus supplying the three-phase AC voltage to the motor-generator 41. In addition, the inverter 37 is configured to convert the three-phase AC voltage generated by the motor-generator 41 into a DC voltage when the motor-generator 41 serves as a generator, thus supplying the DC voltage to the main battery 31.

The DC/DC converter 36 is configured to step down the DC voltage based on the main battery 31, and supply the stepped-down DC voltage to both the auxiliary battery 32 and auxiliary devices 42. The auxiliary battery 32 is configured to output a DC voltage for driving the auxiliary devices 42. The auxiliary devices 42 include various peripheral devices of the vehicle 10, such as an air-conditioner, an electric power-steering apparatus, headlights, direction indicators, and wipers, and various accessory devices of the vehicle 10. The DC/DC converter 36 can be eliminated.

The power meter 44 is configured to measure the amount of power received by the power receiving coil 35. The amount of power measured by the power meter 44 is stored in the storage unit 140 by a received-power storing routine described later. The amount of power measured by the power meter 44 can be displayed on a display device 300 (see FIG. 2) installed in the body of the vehicle 10. When receiving wirelessly transmitted power while the vehicle 10 is traveling, the power transfer controller 33 is configured to control the power receiving circuit 34 to receive the wirelessly transmitted power.

Configuration of Vehicle Control Apparatus 10 and Coil Position Estimating Apparatus 150

The vehicle 10 includes, as illustrated in FIG. 2, the vehicle control apparatus 100, the coil position estimating apparatus 150, the surrounding sensors 120, the internal sensors 130, the storage unit 140, a drive-power control ECU 220, a brake control ECU 230, a steering control ECU 240, and the display device 300. The vehicle control apparatus 100, the coil position estimating apparatus 150, the driving-power control ECU 220, the brake control ECU 230, the steering control ECU 240, and the power transfer controller 33 are configured to be communicable with each other through a vehicular network 250. The vehicular network 250 according to the first embodiment is configured as a Controller Area Network (CAN). In place of the CAN, the vehicular network 250 according to the first embodiment can be configured as a FlexRay network developed by FlexRay Consortium, Ethernet®, or other networks installable in vehicles.

The vehicle control apparatus 100 controls driving of the vehicle 10. The vehicle control apparatus 100 of the first embodiment is configured as an ECU that includes a CPU 110, a memory device 118, and an internal bus 119 through which the CPU 110 and the memory device 118 are connected to each other.

The CPU 110 is configured to execute one or more control programs previously stored in the memory device 118 to accordingly serve as a stop position determiner 111, a current position identifier 112, a separation distance acquiring unit 113, a stop position notifying unit 114, and an autonomous driving controller 115.

The stop position determiner 111 is configured to determine a stop position of the vehicle 10. Specifically, the stop position determiner 111 is configured to determine the stop position of the vehicle 10 in accordance with positions of the respective power transmission coils 21 estimated by a coil position estimator 153 described later.

The current position identifier 112 is configured to identify the current position of the vehicle 10. Specifically, the current position identifier 112 of the first embodiment is configured to acquire position information on the vehicle 10 from an own-vehicle position sensor 131 described later to accordingly identify the current position of the vehicle 10.

The separation distance acquiring unit 113 is configured to acquire a separation distance between the vehicle 10 and a preceding vehicle in the direction of travel of the vehicle 10. The preceding vehicle means one of vehicles traveling in front of the vehicle 10, which is located nearest to the vehicle 10. The direction of travel of the vehicle 10 has a broad concept including both the direction of forward movement of the vehicle 10 and the direction of rearward movement of the vehicle 10. Specifically, the separation distance acquiring unit 113 is configured to acquire the separation distance in accordance with detection results of the surrounding sensors 120.

The stop position notifying unit 114 is configured to notify the stop position of the vehicle 10 determined by the stop position determiner 111 to the autonomous driving controller 115.

The autonomous driving controller 115 is configured to control autonomous driving of the vehicle 10. The vehicle 10 is configured to be autonomously and manually driven. In an autonomous driving mode, the vehicle 10 is driven while being autonomously steered even if the steering wheel of the vehicle 10 for manipulating the driving of the vehicle 10 is not operated by the driver of the vehicle 10. Alternatively, in the autonomous driving mode, autonomous accelerating or decelerating of the vehicle 10 is carried out while steering of the vehicle 10 is manually carried out. The autonomous driving controller 115 is configured to control (i) steering, (ii) accelerating, and (iii) braking of the vehicle 10 through the respective driving-power control ECU 220, brake control ECU 230, and steering control ECU 240 to accordingly implement such an autonomous driving mode.

In contrast, in a manual mode, the driver manipulates the steering wheel, an accelerator pedal, and a brake pedal to accordingly control steering and accelerating/decelerating of the vehicle 10, thus manually driving the vehicle 10.

The coil position estimating apparatus 150 estimates the positions of the power transmission coils 21 located in front of the vehicle 10. The coil position estimating apparatus 150 of the first embodiment is configured as an ECU that includes a CPU 151, a memory device 158, and an internal bus 159 through which the CPU 151 and the memory device 158 are connected to each other.

The CPU 150 is configured to execute one or more control programs previously stored in the memory device 158 to accordingly serve as a past local-maximum position identifier 152, a power-transmission coil position estimator 153, and a received-power storing controller 154.

The past local-maximum position identifier 152 is configured to identify positions along the road 4 at each of which power received in the past became locally maximum; the positions will also be referred to as local-maximum positions. How the past local-maximum position identifier 152 identifies the local-maximum positions will be described later.

The power-transmission coil position estimator 153 is configured to estimate the positions of the power transmission coils 21 located in front of the vehicle 10. How the power-transmission coil position estimator 153 estimates the positions of the power transmission coils 21 will be described later.

The received-power storing controller 154 is configured to execute a received-power storing task described later to accordingly control storing of power received by the power receiving apparatus 3 while the vehicle 10 is traveling.

Each of the surrounding sensors 120 is configured to measure externally surrounding information around the vehicle 10; the surrounding information is required for autonomous driving of the vehicle 10. The surrounding sensors 120 include at least one camera 121 and at least one object sensor 122. The at least one camera 121 is configured to capture images of the surroundings around the vehicle 10. The at least one object sensor 122 is configured to detect situations around the vehicle 10. As the at least one object sensor 122, at least one sensor using reflected waves, such as at least one laser radar (Lidar), at least one millimeter-wave sensor, or at least one ultrasonic sensor can be used.

The internal sensors 130 include an own-vehicle position sensor 131, acceleration sensors 132, a vehicle speed sensor 133, and a yaw rate sensor 134.

The own-vehicle position sensor 131 is configured to detect the current position of the vehicle 10. As the own-vehicle position sensor 131, one or more global navigation satellite system(s) (GNSS) receivers or one or more gyro sensors can be used.

Each of the acceleration sensors 132 is configured to measure corresponding acceleration of the vehicle 10. The acceleration sensors 132 include, for example, a longitudinal acceleration sensor and a lateral acceleration sensor. The longitudinal acceleration sensor is configured to measure longitudinal acceleration of the vehicle 10 in the longitudinal direction of the vehicle 10. The lateral acceleration sensor is configured to measure lateral acceleration of the vehicle 10. The vehicle speed sensor 133 is configured to measure a current traveling speed of the vehicle 10. The yaw rate sensor 134 is configured to measure a yaw rate, i.e., a rotational angular velocity, of the vehicle 10 around an axis passing through the center of gravity of the own vehicle 10. As the yaw rate sensor 134, a gyro sensor can be used.

Each of the surrounding sensors 120 and the internal sensors 130 is configured to transmit, to each of the vehicle control apparatus 110 and the coil position estimating apparatus 150, corresponding measurement data.

The storage unit 140 is configured to be accessible from the vehicle control apparatus 100 and the coil position estimating apparatus 150. The storage unit 140 includes a map information storage 141 and a received-power storage 142.

The map information storage 141 stores map information required for autonomous driving of the vehicle 10. The received-power storage 142 stores information on power received during traveling of the vehicle 10 on the road 4.

The drive-power control ECU 220 is configured to control one or more actuators or power sources, such as an engine, that generate drive power for the vehicle 10. If the driver manually drives the vehicle 10, the drive-power control ECU 220 is configured to control the one or more power sources, such as an engine and/or an electric motor, in accordance with the operating amount of the accelerator pedal. In contrast, in the autonomous driving mode, the driving-power control ECU 220 is configured to control the one or more power sources in accordance with requested driving power determined by the autonomous driving controller 115.

The brake control ECU 230 is configured to control one or more actuators that generate braking force for the vehicle 10. If the driver manually drives the vehicle 10, the brake control ECU 230 is configured to control the one or more actuators in accordance with the operating amount of the brake pedal. In contrast, in the autonomous driving mode, the brake control ECU 230 is configured to control the one or more actuators in accordance with requested braking force determined by the autonomous driving controller 115.

The steering control ECU 240 is configured to control a motor that generates steering torque for the steering wheel of the vehicle 10. If the driver manually drives the vehicle 10, the steering control ECU 240 is configured to control the motor in accordance with the driver's operation of the steering wheel to accordingly generate assist torque for assisting the driver's operation of the steering wheel. This enables the driver to operate the steering wheel by a small amount of force, making it possible to perform steering of the vehicle 10. In contrast, in the autonomous driving mode, the steering control ECU 240 is configured to control the motor in accordance with a requested steering angle determined by the autonomous driving controller 115.

The display device 300 is configured to display, to one or more occupants, such as mainly the driver, of the vehicle 10, various menu screens and/or map information using images and/or sound.

Received-Power Storing Routine

When the coil position estimating apparatus 150 is powered on in response to activation of the vehicle 10, the received-power storing controller 154 is configured to perform the received-power storing routine. The received-power storing routine is a routine of storing power received by the power receiving apparatus 3 on the road 4.

Figure 3:
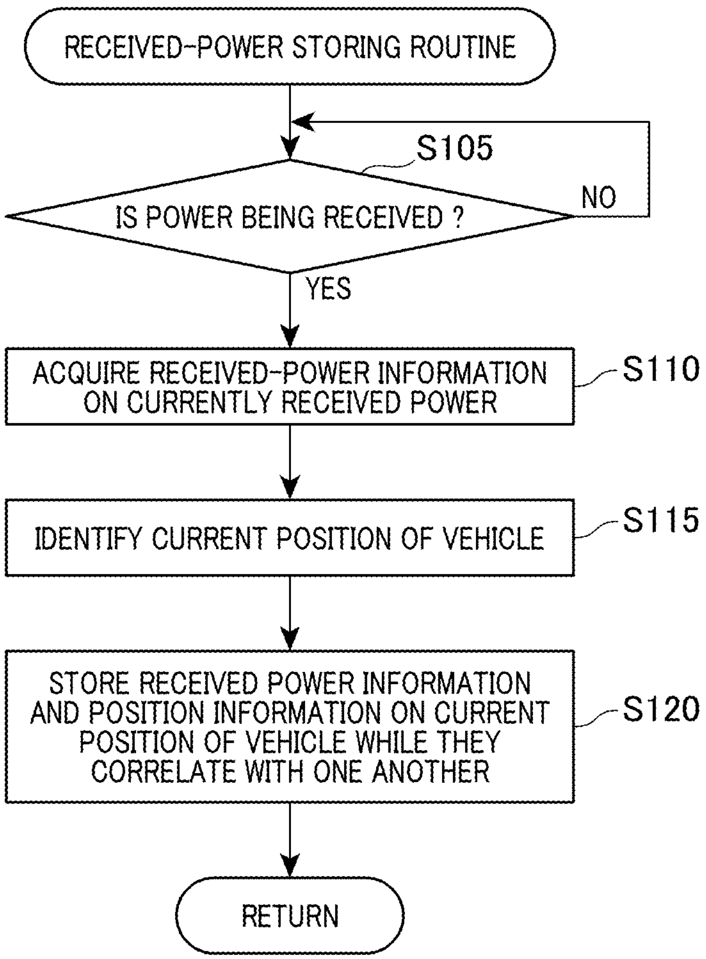
FIG. 3 is a flowchart illustrating a received-power storing routine according to the first embodiment.

Referring to FIG. 3, the received-power storing controller 154 determines whether power is being received through the power receiving coil 35 in accordance with the value of the power meter 44 in step S105. In response to determination that no power is being received through the power receiving coil 35 (NO in step S105), the received-power storing controller 154 repeats the determination in step S105.

Otherwise, in response to determination that power is being received through the power receiving coil 35 (YES in step S105), the received-power storing controller 154 acquires, from the power meter 44, received-power information indicative of currently received power in step S110. In step S115, the current position of the vehicle 10 is identified by the current position identifier 112. The received-power storing controller 154 stores the received-power information acquired in step S110 and position information indicative of the current position of the vehicle 10 in the received-power storage 142 while the received-power information acquired in step S110 correlates with the position information indicative of the current position of the vehicle 10 in step S120.

Figure 4:
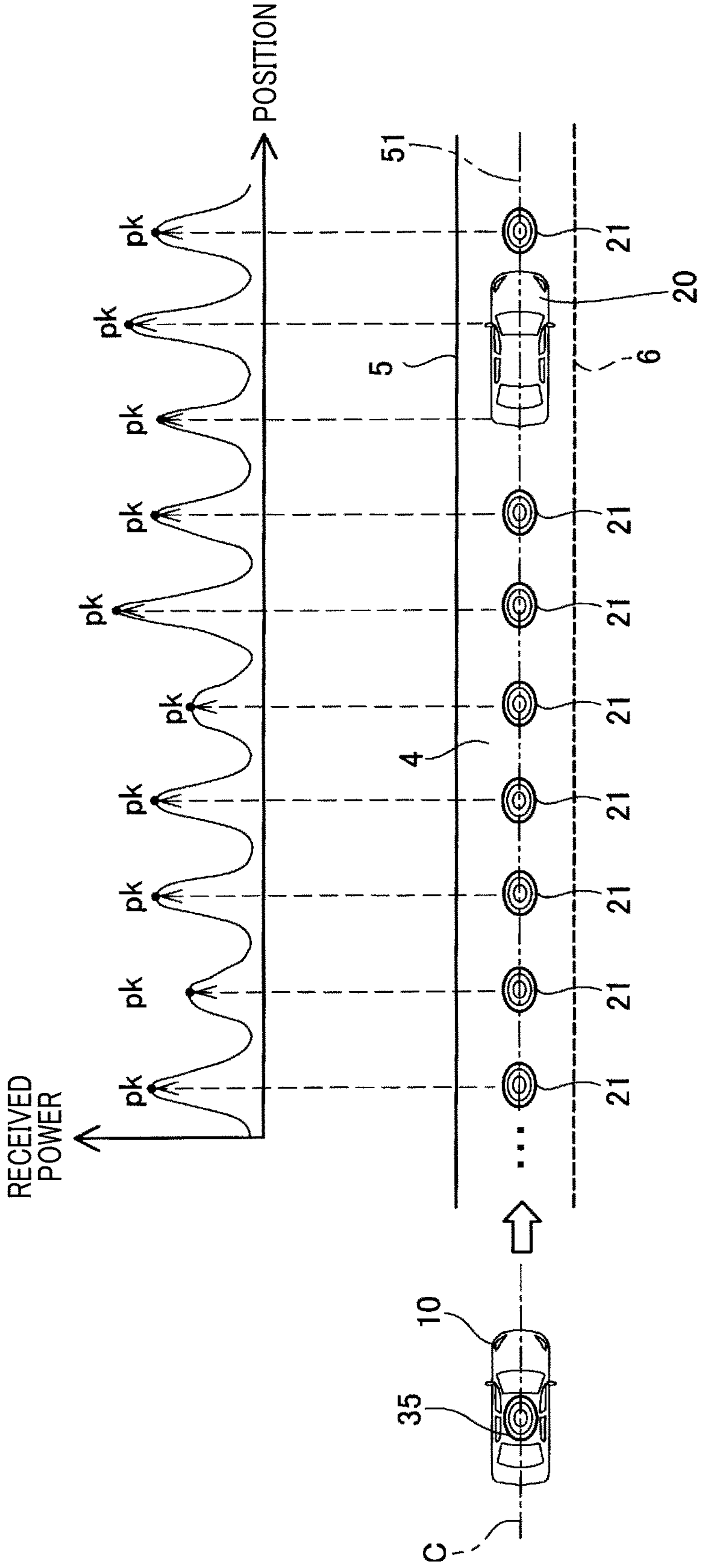
FIG. 4 is a diagram illustrating an example of a relationship between an arrangement of power transmission coils and received power.

As illustrated in FIG. 4, the power transmission coils 21 are usually arranged on or in the road 4 along a center line 51 of the road 4 with predetermined intervals therebetween. That is, the power transmission coils 21 are arranged along the longitudinal direction of the road 4 while an interval between any adjacent pair of power transmission coils 21 is set to a substantially constant distance. All the power transmission coils 21 can be arranged in the road 4 under the surface of the road 4 or embedded in the road while an upper part of each power transmission coil 21 is exposed from the surface of the road 4 and the remaining part of the corresponding power transmission coil 21 is located under the surface of the road 4. The vehicle 10 is controlled to travel on a lane of the road 4 while a center axis C of the vehicle 10 extending in the direction of travel matches the center axis 51 of the lane of the road 4. Specifically, in FIG. 4, the lane in which the vehicle 10 and a preceding vehicle 20 is defined by a white line 5 as the left boundary line in the direction of the forward movement of the vehicle 10 and a center line 6 as the right boundary line in the direction of the forward movement of the vehicle 10, and the power transmission coils 21 are mounted to the lane defined by the while line 5 and the center line 6, but the power transmission coils 21 can be mounted to each of the other lanes.

As illustrated in the upper part of FIG. 4, the received power periodically changes. Specifically, the level of the received power increases as the distance between the position of the received coil 35 in the direction of travel and the position of any power transmission coil 21 in the direction of travel decreases. When the position of the received coil 35 in the direction of travel matches the position of any power transmission coil 21 in the direction of travel, the level of the received power becomes a local maximum level pk. The level of the received power decreases as the distance between the position of the received coil 35 in the direction of travel and the position of any power transmission coil 21 in the direction of travel increases.

The local maximum level pk of the received power for any power transmission coil 21 is a local peak level. Therefore, as illustrated in FIG. 4, the absolute local maximum levels pk of the received power for the respective power transmission coils 21 located at the different positions are usually different depending on, for example, (i) their relative positional deviations in the width direction perpendicular to the direction of travel and/or (ii) their variations in coil characteristic due to their manufacturing variations.

The received power stored in the storage unit 140, i.e., the received-power storage 142, by the received-power storing routine can be used by a stop position determining routine described later.

Stop Position Determining Routine

When each of the coil position estimating apparatus 150 and the vehicle control apparatus 100 is powered on in response to activation of the vehicle 10, the coil position estimating apparatus 150 and the vehicle control apparatus 100 are configured to perform the stop position determining routine. The stop position determining routine is a routine of determining the stop position of the vehicle 10.

Figure 5:
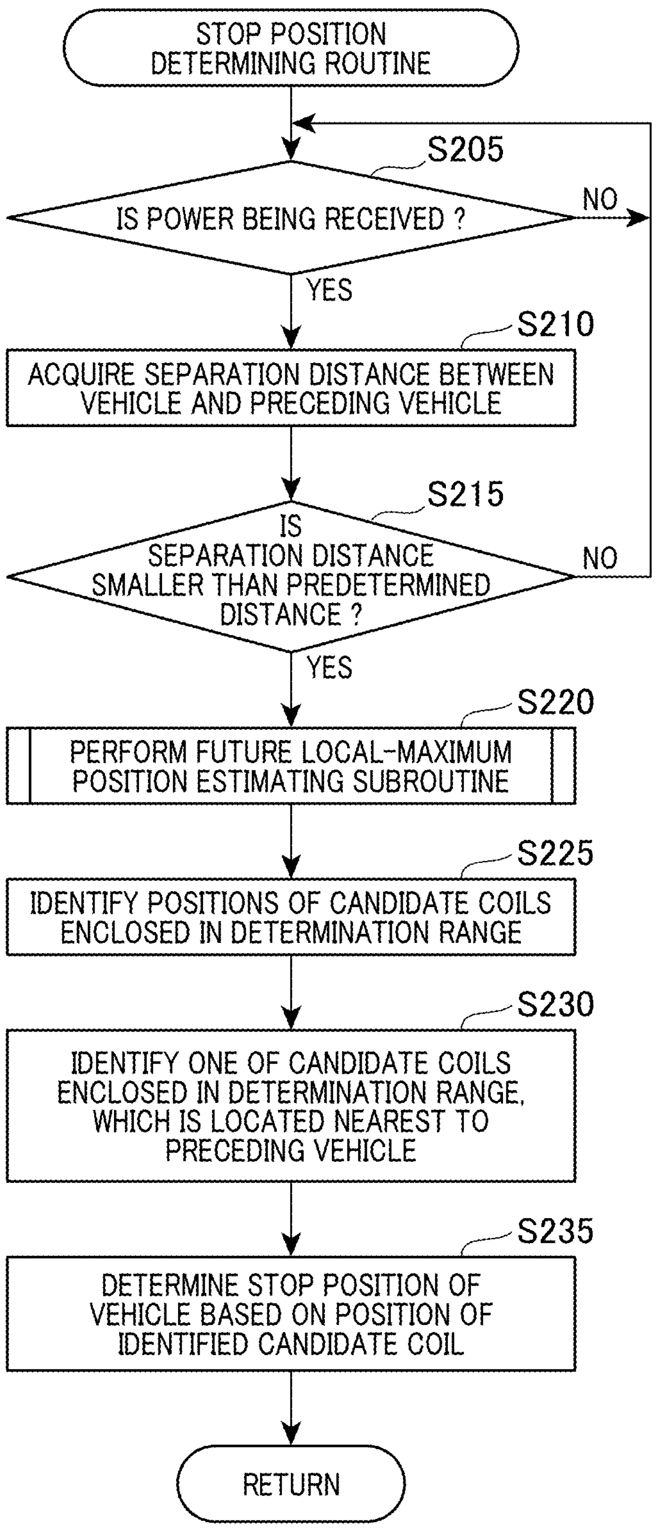
FIG. 5 is a flowchart illustrating a stop position determining routine according to the first embodiment.

Referring to FIG. 5, the separation distance acquiring unit 113 determines whether power is being received through the power receiving coil 35 in accordance with the value of the power meter 44 in step S205. In response to determination that no power is being received through the power receiving coil 35 (NO in step S205), the separation distance acquiring unit 113 repeats the determination in step S205.

Otherwise, in response to determination that power is being received through the power receiving coil 35 (YES in step S205), the separation distance acquiring unit 113 acquires the separation distance between the vehicle 10 and the preceding vehicle in step S210, and determines whether the separation distance is smaller than a predetermined distance in step S215. The predetermined distance in step S215 represents a distance previously determined as a distance at which the vehicle 10 is in a state that braking of the vehicle 10 must start. The predetermined distance is previously determined by experiments or other similar methods. For example, the separation distance becomes smaller than the predetermined distance when the preceding vehicle is stopped or decelerated. In response to determination that the separation distance is greater than or equal to the predetermined distance (NO in step S215), the separation distance acquiring unit 113 returns to step S205.

Otherwise, in response to determination that the separation distance is smaller than the predetermined distance (YES in step S215), a future local-maximum position estimating subroutine is carried out in step S220. The future local-maximum position estimating subroutine means a subroutine of estimating, in a forward section of the road from the current position of the vehicle 10, positions at each of which a corresponding level of power to be received by the power receiving apparatus is likely to become locally maximum, i.e., the power receiving coil 35 is located to face a corresponding one of the power transmission coils 21; these positions will be referred to as future local-maximum positions.

Figure 6:
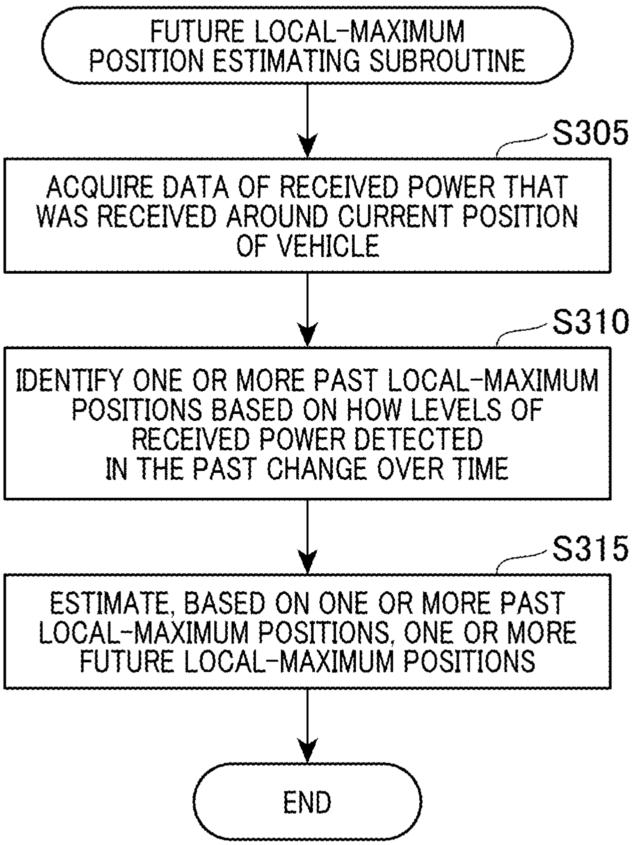
FIG. 6 is a future local-maximum position estimating subroutine according to the first embodiment.

FIG. 6 illustrates the future local-maximum position estimating subroutine. Referring to FIG. 6, the past local-maximum position identifier 152 acquires, from the received-power storage 142, data of the received-power in step S305; the data of the received power was received near the current position of the vehicle 10.

For example, data d1 of the received power illustrated in FIG. 7 is acquired. The data d1 includes the levels of the received power and the positions at which the respective levels of the received power are detected. For the sake of simple description, the distance of each position relative to the current position of the vehicle 10 is represented as the information on the corresponding position. In FIG. 7, a minus (−) value of the distance means a distance from the current position of the vehicle 10 in the rearward direction of the vehicle 10.

In step S310 of FIG. 6, the past local-maximum position identifier 152 identifies one or more past local-maximum positions in accordance with how the levels of the received power detected in the past change over time. In the data d1 illustrated in FIG. 7, four past local-maximum positions B1, B2, B3, and B4 along the road 4 are identified as data d2.

Next, in step S315 of FIG. 6, the past local-maximum position identifier 152 estimates, based on the one or more previous local-maximum positions identified in step S310, one or more future local-maximum positions.

Specifically, the past local-maximum position identifier 152 calculates, based on the data d2 illustrated in FIG. 7, an average distance of the distances, each of which represents a corresponding respective adjacent pair of the past local-maximum positions in the direction of travel; the average distance is, for example, 0.5 m in step S315. Then, the past local-maximum position identifier 152 identifies the position at +0.3 m from the current position of the vehicle 10 in the forward direction as the nearest future local-maximum position in step S315. Additionally, the past local-maximum position identifier 152 successively estimates, from the nearest future local-maximum position, positions in the forward section of the road 4 located at intervals of the average distance of only 0.5 m, which are respectively defined as future local-maximum positions.

For example, FIG. 7 illustrates an example where seven future local-maximum positions including the nearest feature local-maximum position N1, N2, N3, N4, N5, N6, and N7 are estimated as data d3.

Following the operation in step S220 of FIG. 5, the stop position determiner 111 identifies positions of the power transmission coils 21 included in a determination range in step S225; the positions of the power transmission coils 21 according to the first embodiment match the respective future local-maximal positions.

Figure 8:
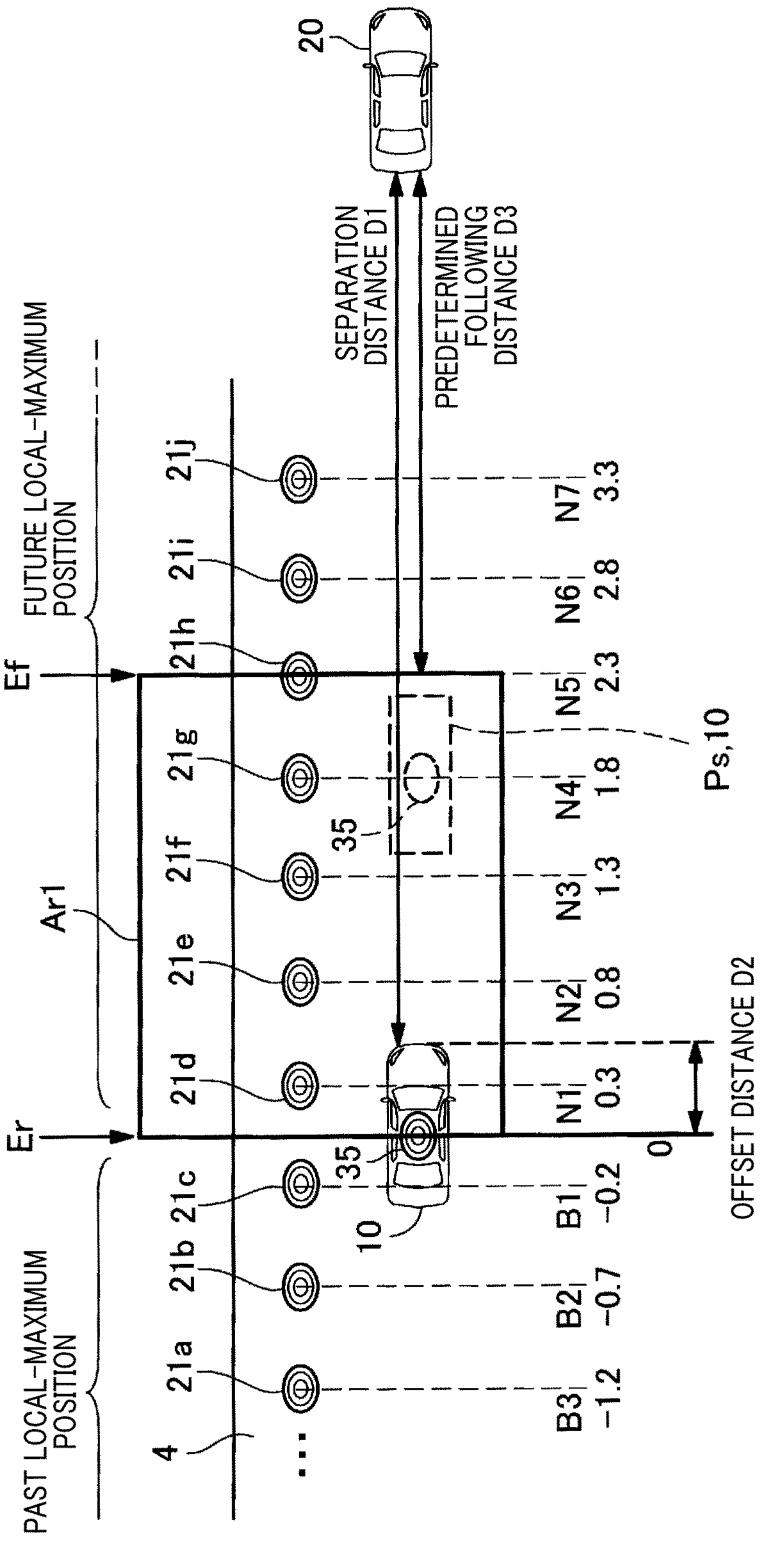
FIG. 8 is a diagram schematically illustrating an example of a stop position of the vehicle determined by the future local-maximum position estimating subroutine.

FIG. 8 illustrates the power transmission coils 21, the vehicle 10, and the other elements corresponding to the data d1, the data d2, and the data d3. In FIG. 8, for easily distinguishing the power transmission coils 21 from one another, different reference characters 21*a* to 21*j* are assigned to the respective power transmission coils 21. In FIG. 8, for the sake of simple illustration, the position of the vehicle 10 in the width direction of the road 4 is shifted from the alignment of the power transmission coils 21*a* to 21*j*.

The determination range Ar1 means a range that encloses one or more candidate coils of the power transmission coils 21, so that, when being stopped, the vehicle 10 is likely to face one of the candidate coils.

The determination range Ar1 has a rear end Er. The rear end Er of the determination range Ar1 is defined to be separated from the rear end of the preceding vehicle 20 in the rearward direction by only the sum of the separation distance D1 and an offset distance D2. The offset distance D2 means a distance from the front end of the vehicle 10 to the power receiving coil 35 in the direction of travel. Defining the rear end Er of the determination range Ar1 set forth above makes it possible to identify, with high accuracy, one or more of the power transmission coils 21, which are located in front of the current position of the vehicle 10, more accurately, the position of the power receiving coil 35 installed in the vehicle 10, as one or more candidate coils.

Additionally, the determination range Ar1 has a front end Ef. The front end Ef of the determination range Ar1 is defined to be separated from the rear end of the preceding vehicle 20 in the rearward direction by a predetermined distance D3; the distance D3 will be referred to as a predetermined following distance D3. Defining the front end Ef of the determination range Ar1 set forth above makes it possible to identify one or more of the power transmission coils 21 as one or more candidate coils while enabling the vehicle 10 to be stopped with a secured following distance with respect to the preceding vehicle 20.

In the example illustrated in FIG. 8, the stop position determiner 111 identifies positions of four power transmission coils 21*d*, 21*e*, 21*f*, and 21*g* enclosed in the determination range Ar1 as those of candidate coils in step S225.

In step S230 subsequent to the operation in step S225 of FIG. 5, the stop position determiner 111 identifies one of the candidate coils enclosed in the determination range Ar1 and identified in step S225; the identified candidate coil is located nearest to the preceding vehicle 20. Then, in step S230, the top-position determiner 111 identifies the position of the identified candidate coil in step S230.

In the example illustrated in FIG. 8, the power transmission coil 21*g* is identified in the four candidate coils 21*d*, 21*e*, 21*f*, and 21*g* enclosed in the determination range Ar1, and the position of the identified power transmission coil 21*g* is identified.

Next, the stop position determiner 111 determines a stop position of the vehicle 10 based on the position of the identified candidate coil in step S235.

In the example illustrated in FIG. 8, a position Ps on the road 4 is identified as a stop position where, when the vehicle 10 is stopped at the position Ps, the power transmission coil 35 of the vehicle 10 is located to face the power transmission coil 21*g* identified in step S230.

For example, the stop position Ps according to the first embodiment is identified for the target of the front end of the vehicle 10. The stop position Ps can be identified for the target of any identifiable position of the vehicle 10, such as the rear end of the vehicle 10.

After completion of the operation in step S235, the stop position determining routine returns to the operation in step S205.

The coil position estimating apparatus 150 of the first embodiment described set forth above is configured to identify one or more past local-maximum positions along the road 4 at each of which a corresponding level of power received in the past became locally maximum. Then, the coil position estimating apparatus 150 is configured to determine, based on the one or more past local-maximum positions, one or more future local maximum positions in a forward section of the road 4 from the vehicle 10 at each of which a corresponding level of received power is likely to become locally maximum. Then, the coil position estimating apparatus 150 is configured to estimate the one or more future local maximum positions as positions of corresponding one or more power transmission coils 21 in the forward section of the road 4.

This configuration therefore enables the positions of the power transmission coils 21 located in the forward section of the road 4 to be estimated with high accuracy. Additionally, this configuration enables the estimation without configurations being required to transfer positioning signals between the power receiving coil 35 and the power transmission coils 21, making it possible to suppress cost increases as compared with configurations that use equipment required to transfer positioning signals between the power receiving coil 35 and the power transmission coils 21.

The vehicle control apparatus 100 of the first embodiment includes the stop position determiner 111 for determining a stop position of the vehicle 10 in accordance with the identified positions of the one or more power transmission coils 21. This makes it possible to determine the stop position of the vehicle 10 where one of the power transmission coils 21 and the power receiving coil 35 of the vehicle 10 being stopped have a positional relationship that enables highly-efficient power transfer therebetween.

The vehicle control apparatus 100 of the first embodiment is configured to determine the stop position of the vehicle 10 based on the estimated positions of the one or more power transmission coils 21, the acquired separation distance, and the determined current position of the vehicle 10. This makes it possible to determine, with high accuracy, the stop position of the vehicle 10 where one of the power transmission coils 21 and the power receiving coil 35 of the vehicle 10 being stopped have a positional relationship that enables high-efficient power transfer therebetween.

The vehicle control apparatus 100 of the first embodiment is configured to determine the stop position of the vehicle 10 based on the position of the power transmission coil 21*g* selected from the power transmission coils 21*d*, 21*e*, 21*f*, and 21*g* enclosed in the determination range Ar1; the selected power transmission coil 21*g* is located closest to the preceding vehicle 20. The rear end Er of the determination range Ar1 is defined to be separated from the rear end of the preceding vehicle 20 in the rearward direction by merely the sum of the separation distance D1 and the offset distance D2; the offset distance D2 means the distance from the front end of the vehicle 10 to the power receiving coil 35 in the direction of travel. The front end Ef of the determination range Ar1 is defined to be separated from the rear end of the preceding vehicle 20 in the rearward direction by merely the predetermined distance D3. This therefore makes it possible to accurately determine the stop position of the vehicle 10 in accordance with the position of the power receiving coil 35 in the traveling direction of the vehicle 10, and determine the stop position of the vehicle 10 while ensuring the distance D3 as a secured following distance with respect to the preceding vehicle 20.

Additionally, the configuration of the vehicle control apparatus 100 makes shorter the distance between the preceding vehicle 20 and the vehicle 10 as compared with a case where the stop position of the vehicle 10 is determined based on the positions of the power transmission coils 21*d*, 21*e*, and 21*f*, which are located to be farther away from the preceding vehicle 20 than the power transmission coil 21*g* is, thus improving the use efficiency of the road.

Second Embodiment

Figure 9:
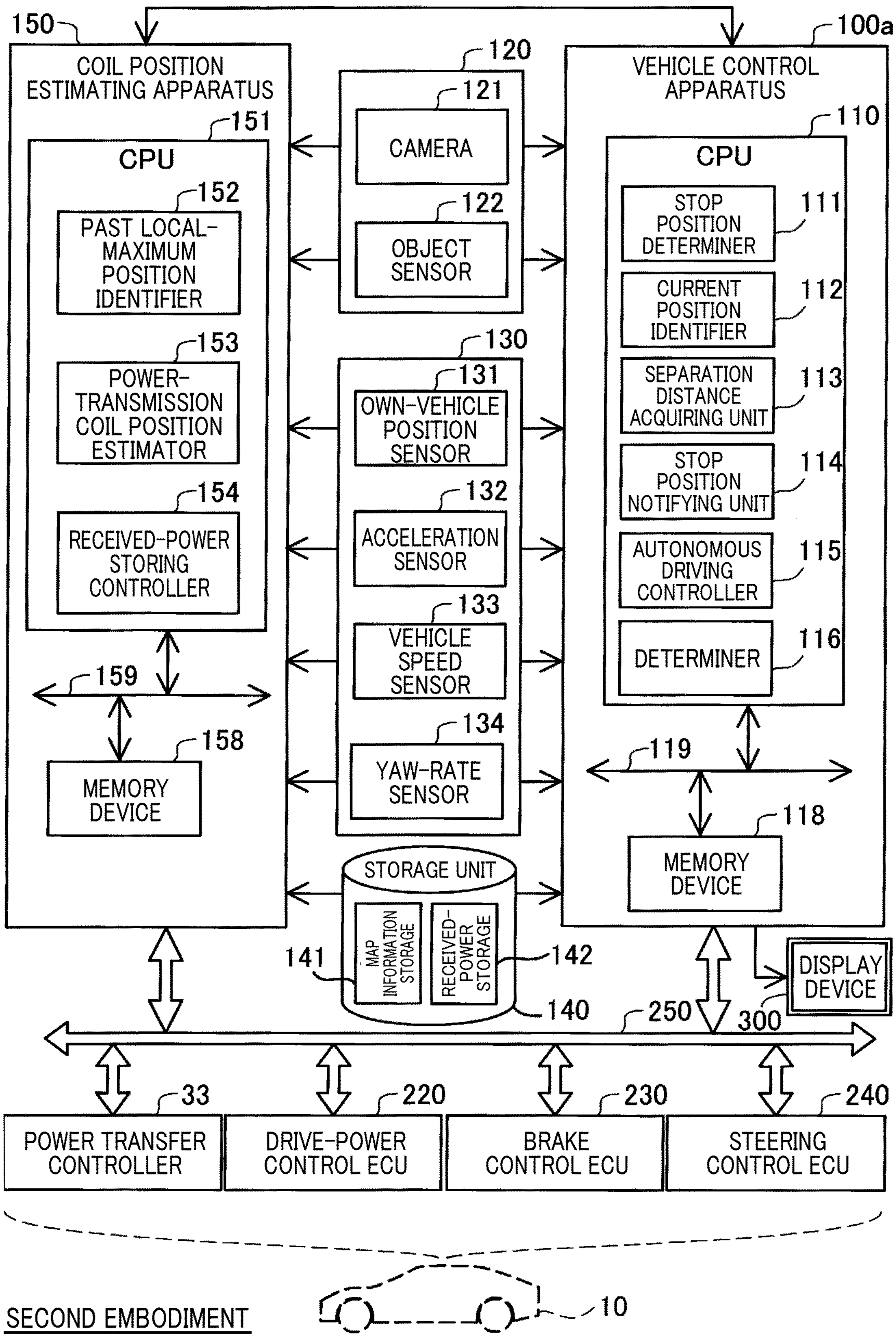
FIG. 9 is a block diagram illustrating a schematic configuration of a moving power transfer system according to the second embodiment of the present disclosure.

A vehicle control apparatus 100*a* of the second embodiment illustrated in FIG. 9 is different from the vehicle control apparatus 100 of the first embodiment illustrated in FIG. 1 in that the CPU 110 of the vehicle control apparatus 100*a* serves as a determiner 116. Because the other configuration of the vehicle control apparatus 100*a* of the second embodiment is identical to that of the vehicle control apparatus 100 of the first embodiment, reference characters used for the components of the vehicle control apparatus 100 are assigned to the same components of the vehicle control apparatus 100*a*, and therefore the detailed descriptions for the same components of the vehicle control apparatus 100*a* are omitted. The operations performed by the determiner 116 will be described later.

Figure 10:
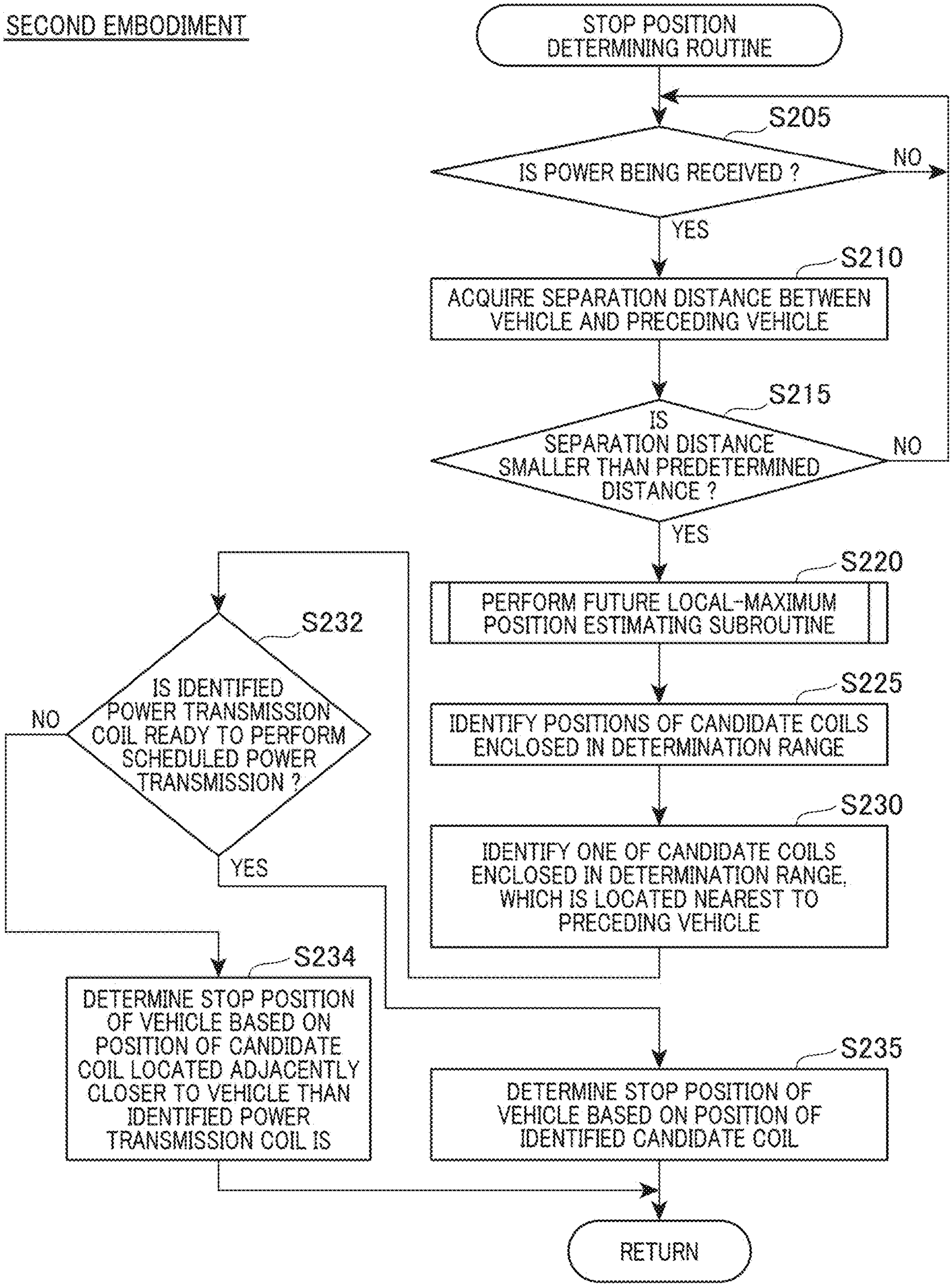
FIG. 10 is a flowchart illustrating a stop position determining routine according to the second embodiment.

A stop position determining routine of the second embodiment illustrated in FIG. 10 is different from the stop position determining routine of the first embodiment illustrated in FIG. 5 in that the stop position determining routine illustrated in FIG. 10 additionally includes operations in steps S232 and S234. Because the other procedure of the stop position determining routine of the second embodiment is identical to that of the stop position determining routine of the first embodiment, step numbers used for the operations in the top position determining routine of the first embodiment are assigned to the same operations in the stop position determining routine of the second embodiment, and therefore the detailed descriptions for the same operations in the stop position determining routine of the second embodiment are omitted.

Referring to FIG. 10, after identifying the power transmission coil 21 located nearest to the preceding vehicle 20 in the power transmission coils 21 enclosed in the determination range Ar1 in step S230, the determiner 116 determines whether the identified power transmission coil 21, which is located nearest to the preceding vehicle 20, is ready to perform scheduled power transmission in step S232.

Specifically, the determiner 116 of the second embodiment determines whether there are one or more obstacles substantially at the position of the identified power transmission coil 21. Then, the determiner 116 determines that the identified power transmission coil 21 is not ready to perform scheduled power transmission upon determination that there are one or more obstacles substantially at the position of the identified power transmission coil 21, and otherwise determines that the identified power transmission coil 21 is ready to perform scheduled power transmission upon determination that there are no obstacles substantially at the position of the identified power transmission coil 21.

If there are one or more obstacles substantially at the position of the identified power transmission coil 21, the identified power transmission coil 21 may be unlikely to perform power transmission or may have difficulty in transmitting a scheduled amount of power. From this viewpoint, the vehicle control apparatus 100*a* of the second embodiment is configured to determine that the identified power coil 21 is not ready to perform scheduled power transmission.

In response to determination that the identified power transmission coil 21, which is located nearest to the preceding vehicle 20, is ready to perform scheduled power transmission (YES in step S232), the stop position determiner 111 performs the operation in step S235.

In contrast, in response to determination that the identified power transmission coil 21, which is located nearest to the preceding vehicle 20, is not ready to perform scheduled power transmission (NO in step S232), the stop position determiner 111 determines a stop position of the vehicle 10 based on the position of the candidate coil that is located adjacent to the identified candidate coil and located closer to the vehicle 10 than the identified candidate coil is in step S234.

In the example illustrated in FIG. 8, the stop position of the vehicle 10 is determined based on the position of the power transmission coil 21*f* that is located adjacent to the power transmission coil 21*g* and located to be closer to the vehicle 10 than the power transmission coil 21*g* is in response to determination that there are one or more obstacles substantially at the position of the identified power transmission coil 21.

After completion of the operation in step S234, the stop position determining routine returns to the operation in step S205.

The vehicle control apparatus 100*a* of the second embodiment described set forth above achieves the same advantageous benefits as those achieved by the vehicle control apparatus 100 of the first embodiment.

Additionally, the vehicle control apparatus 100*a* of the second embodiment is configured to determine the stop position of the vehicle 10 based on the position of the power transmission coil 21 that is (i) located adjacent to the identified power transmission coil 21 located nearest to the preceding vehicle 20 and (ii) located closer to the vehicle 10 than the identified power transmission coil 21 in response to determination that the identified power transmission coil 21 located nearest to the preceding vehicle 20 is not ready to perform scheduled power transmission.

This configuration therefore prevents the power receiving coil 35 being located to face an identified power transmission coil 21 located nearest to the preceding vehicle 20, which is not ready to perform scheduled power transmission.

Third Embodiment

Figure 11:
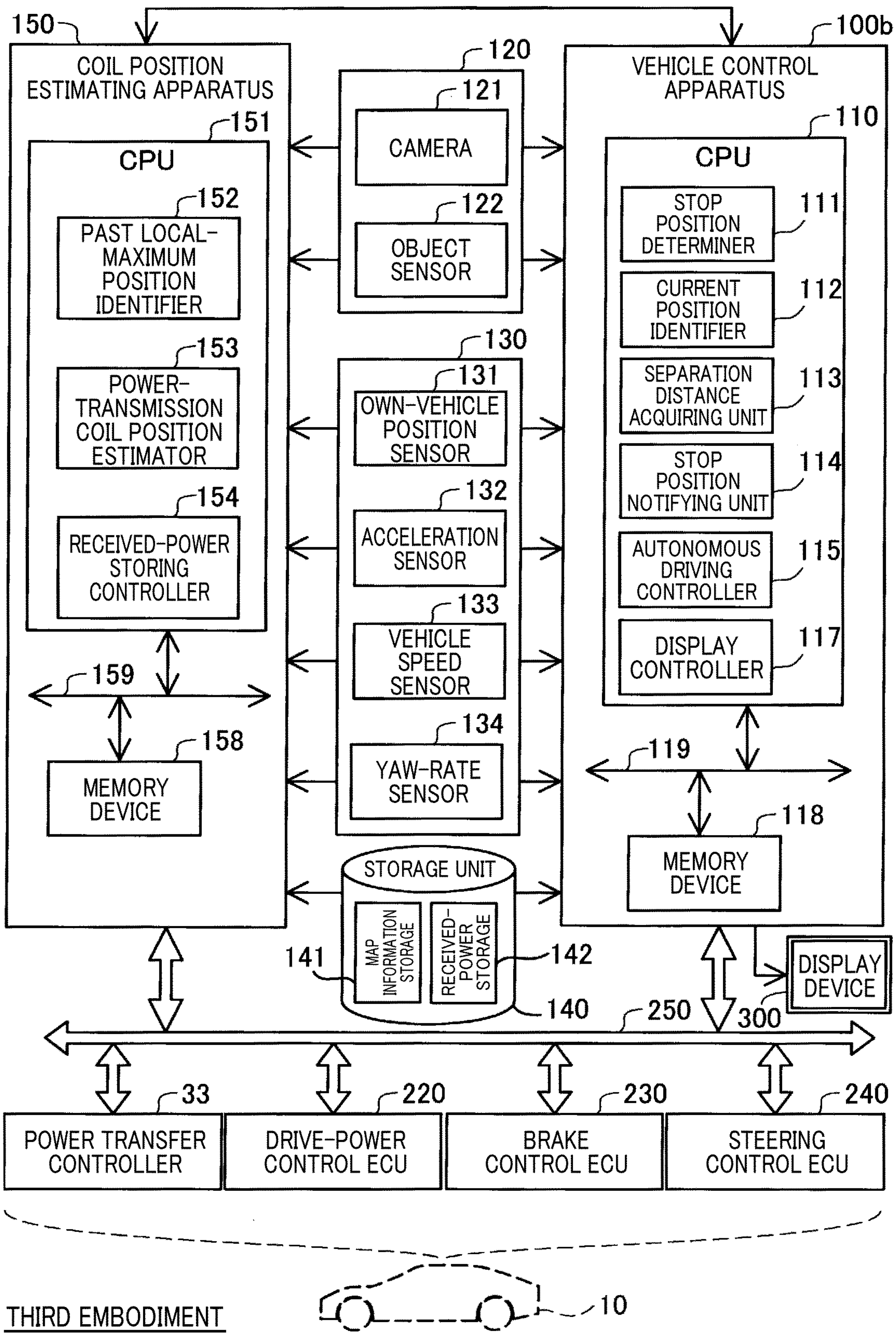
FIG. 11 is a block diagram illustrating a schematic configuration of a moving power transfer system according to the third embodiment of the present disclosure.

A vehicle control apparatus 100*b* of the third embodiment illustrated in FIG. 11 is different from the vehicle control apparatus 100 of the first embodiment illustrated in FIG. 1 in that the CPU 110 of the vehicle control apparatus 100*b* serves as a display controller 117. Because the other configuration of the vehicle control apparatus 100*b* of the third embodiment is identical to that of the vehicle control apparatus 100 of the first embodiment, reference characters used for the components of the vehicle control apparatus 100 are assigned to the same components of the vehicle control apparatus 100*b*, and therefore the detailed descriptions for the same components of the vehicle control apparatus 100*b* are omitted.

The display controller 117 is configured to display the stop position of the vehicle 10 determined by the stop position determining routine and the current position of the vehicle 10 on the display device 300.

Figure 12:
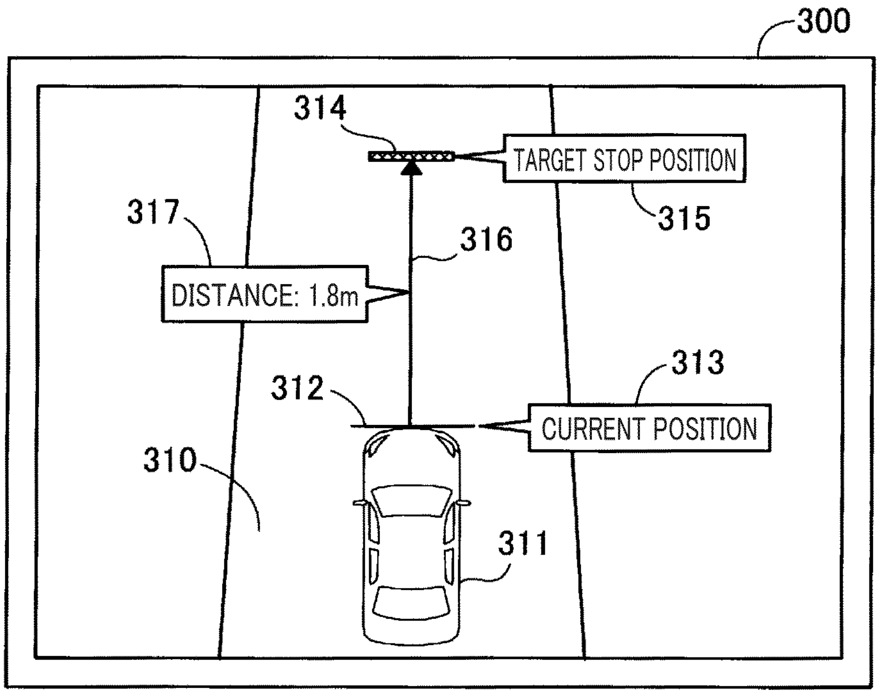
FIG. 12 is a diagram illustrating an example of information displayed on a display device according to the third embodiment.

Specifically, as illustrated in FIG. 12, the display controller 117 is configured to display, on the display device 300, (I) an image 310 showing the road 4, (II) an image 311 showing the vehicle 10, (III) an image 312 showing the front end of the vehicle 10, (IV) an image 314 showing the determined stop position, (V) an image 316 of an arrow extending from the current position of the vehicle 10 to the stop position of the vehicle 10, (VI) an image 313 related to the image 312, which shows a message of "CURRENT POSITION", (VII) an image 315 related to the image 314, which shows a message of "TARGET STOP POSITION" that means the determined stop position, and (VIII) an image 317 related to the image 316, which shows a message of "DISTANCE: 1.8 m" that represents a distance from the current position to the stop position in the traveling direction.

The vehicle control apparatus 100*b* of the third embodiment described set forth above achieves the same advantageous benefits as those achieved by the vehicle control apparatus 100 of the first embodiment.

Additionally, the vehicle control apparatus 100*b* of the third embodiment is configured to display the determined stop position of the vehicle 10 and the current position of the vehicle 10. This configuration therefore enables the driver of the vehicle 10 to predict both the amount and the timing of braking the vehicle 10 in the autonomous driving mode or to perform braking operation in accordance with the displayed stop position in the manual driving mode to accordingly improve the drivability of the vehicle 10.

Fourth Embodiment

The configuration of each of a vehicle control apparatus 100 and a coil position estimating apparatus 150 according to the fourth embodiment is identical to that of the corresponding one of the vehicle control apparatus 100 and the coil position estimating apparatus 150. Reference characters used for the components of the apparatuses 100 and 150 of the first embodiment are assigned to the same components of the apparatuses 100 and 150 of the fourth embodiment, and therefore the detailed descriptions for the same components of the apparatuses 100 and 150 of the fourth embodiment are omitted.

Like the first embodiment, the fourth embodiment performs the received-power storing routine, the stop position determining routine, and the future local-maximum position estimating subroutine. In particular, the fourth embodiment performs a reduced-speed travel routine illustrated in FIG. 13, which is different from the first embodiment. The reduced-speed travel routine is programmed to be carried out by the vehicle control apparatus 110 from the stopped state of the vehicle 10 to the start of traveling of the vehicle 10 at speeds lower than or equal to a predetermined speed.

Figure 13:
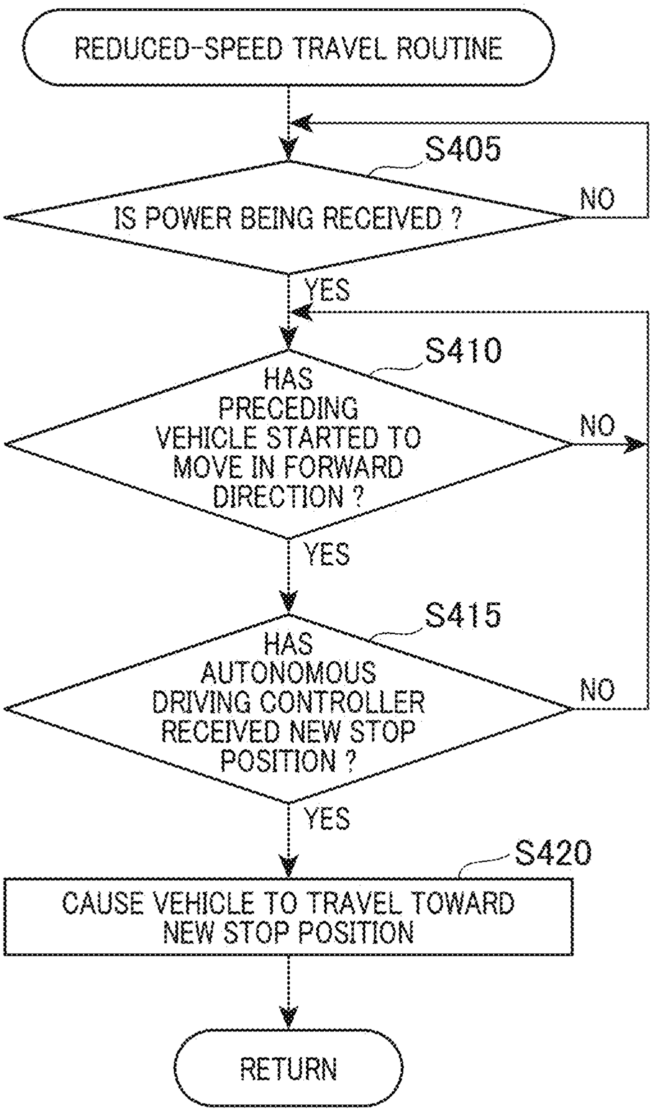
FIG. 13 is a flowchart illustrating a reduced-speed travel routine according to the fourth embodiment.

Referring to FIG. 13, the autonomous driving controller 115 determines whether power is being received through the power receiving coil 35 in accordance with the value of the power meter 44 in step S405. In response to determination that no power is being received through the power receiving coil 35 (NO in step S405), the autonomous driving controller 115 repeats the determination in step S405.

Otherwise, in response to determination that power is being received through the power receiving coil 35 (YES in step S405), the autonomous driving controller 115 determines whether the preceding vehicle 20 has started to move in the forward direction since stop of the vehicle 10 in step S410. Upon determination that the preceding vehicle 20 has not started to move in the forward direction since stop of the vehicle 10 (NO in step S410), the autonomous driving controller 115 repeats the determination in step S410.

Otherwise, upon determination that the preceding vehicle 20 has started to move in the forward direction since stop of the vehicle 10 (YES in step S410), the autonomous driving controller 115 determines whether the autonomous driving controller 115 has received a new stop position determined by and sent from the stop position determiner 111 in step S415.

The stop position determiner 111 determines, after the start of forward movement of the preceding vehicle, whether (i) the separation distance between the vehicle 10 and the preceding vehicle in the direction of travel of the vehicle 10 is smaller than or equal to the predetermined distance and (ii) at least one future local-maximum position estimated as the corresponding at least one power transmission coil 21 set forth above is located in the forward direction of the vehicle 10 and in the rear of the preceding vehicle 20. In response to determination that (i) the separation distance between the vehicle 10 and the preceding vehicle in the direction of travel of the vehicle 10 is smaller than or equal to the predetermined distance and (ii) a future local-maximum position estimated as the position of the corresponding power transmission coil 21 set forth above is located in the forward direction of a current stop position of the vehicle 10 and in the rear of the preceding vehicle 20, the stop position determiner 111 determines the future local-maximum position as the new stop position, and notifies the new stop position to the autonomous driving controller 115.

In response to determination that the autonomous driving controller 115 has received the new stop position sent from the stop position determiner 111 (YES in step S415), the autonomous driving controller 115 causes the vehicle 10 to start traveling, at a reduced speed, in the forward direction toward the new stop position notified by the stop position determiner 111 in step S420). In contrast, in response to determination that the autonomous driving controller 115 has not received the new stop position sent from the stop position determiner 111 (NO in step S415), the reduced-speed travel routine returns to step S410.

The vehicle control apparatus 100 of the fourth embodiment described set forth above achieves the same advantageous benefits as those achieved by the vehicle control apparatus 100 of the first embodiment.

Additionally, the vehicle control apparatus 100 of the fourth embodiment is configured to, after the stop of the vehicle 10, maintain the stopped state of the vehicle 10 until, after the start of the forward movement of the preceding vehicle 20, a new stop position is notified thereto, and cause the vehicle 10 to start traveling in the forward direction in response to receiving of the new stop position.

This configuration therefore prevents, after the start of movement of the preceding vehicle 20 in the forward direction, the vehicle 10 from traveling in the forward direction before determination of a new stop position of the vehicle 10, thus preventing the vehicle 10 from being stopped next at a position where efficient power transfer between the vehicle 10 and the power transmission apparatus 2 is hard.

Additionally, in response to determination that (i) the separation distance between the vehicle 10 and the preceding vehicle in the direction of travel of the vehicle 10 is smaller than or equal to the predetermined distance and (ii) the future local-maximum position estimated as the position of the corresponding power transmission coil 21 set forth above is located in the forward direction of the vehicle 10, the stop position determiner 111 determines the future local-maximum position as the new stop position. This configuration therefore more reliably prevents the vehicle 10 from being stopped next at a position where efficient power transfer between the vehicle 10 and the power transmission apparatus 2 is difficult.

Modifications

Each of the first to fourth embodiments is configured to determine the stop position of the vehicle 10 based on the estimated or identified positions of the one or more power transmission coils 21, and cause the vehicle 10 to travel in the autonomous traveling mode so as to be stopped at the stop position. The present disclosure is however not limited to the above embodiments.

For example, the vehicle 10 may not autonomously controlled to stop the stop position while the stop position is displayed on the display device 300 according to the third embodiment. This modified configuration enables the driver of the vehicle 10 to brake the vehicle 10 in accordance with the stop position displayed on the display device 300, making it possible to improve the drivability of the vehicle 10 while eliminating the autonomous driving controller 115.

Each of the first to fourth embodiments is configured to determine the determination range Ar1 with reference to the predetermined following distance D3, but the present disclosure is not limited thereto.

Specifically, each of the first to fourth embodiments may be configured to determine, as the determination range Ar1, a range defined to prevent the front end Ef of the range from contacting to the preceding vehicle 20, such as the front end Ef is defined to be separated from the rear end of the preceding vehicle 20 by 0.5 m.

Each of the first to fourth embodiments is configured to determine the stop position in accordance with one of the candidate coils 21 enclosed in the determination range Ar1, which is located nearest to the preceding vehicle 20, but the present disclosure is not limited thereto.

Specifically, each of the first to fourth embodiments may be configured to determine the stop position in accordance with two coils 21*g* and 21*f* of the candidate coils 21 enclosed in the determination range Ar1, which are located nearer to the preceding vehicle 20 than the other candidate coils 21 are. This modified configuration improves the use efficiency of the road as compared with a case where the stop position of the vehicle 10 is determined based on the positions of the power transmission coils 21*d* and 21*e*, which are located to be farther away from the preceding vehicle 20 than the power transmission coils 21*g* and 21*f* are.

The reduced-speed travel routine of the fourth embodiment is configured to, after the start of the forward movement of the preceding vehicle 20, autonomously cause the vehicle 10 to travel in the autonomous driving mode in the forward direction in response to reception of the new stop position, but the present disclosure is not limited to the above configuration.

Specifically, the reduced-speed travel routine of the fourth embodiment can be applied to the manual driving mode.

For example, upon determination that the preceding vehicle 20 has started to move in the forward direction since stop of the vehicle 10 (YES in step S410) and that the autonomous driving controller 115 has received the new stop position sent from the stop position determiner 111 (YES in step S415), the display controller 117 can be configured to display the new stop position of the vehicle 10 and the current position of the vehicle 10 on the display device 300 in the same manner as stated in the third embodiment.

This modified configuration enables the driver of the vehicle 10 to start the vehicle 10 traveling in the forward direction after the new stop position is displayed on the display device 300. This therefore prevents the vehicle 10 from traveling in the forward direction before determination of the new stop position of the vehicle 10, thus preventing the vehicle 10 from being stopped next at a position where efficient power transfer between the vehicle 10 and the power transmission apparatus 2 is hard.

The configuration of each of the vehicle control apparatuses 100, 100*a*, and 100*b*, and the coil position estimating apparatus 150 described in the above embodiments is an exemplary configuration, and therefore can be appropriately modified.

For example, an apparatus can serve as both one of the vehicle control apparatuses 100, 100*a*, and 100*b* and the coil position estimating apparatus 150.

If the vehicle 10 can be configured to communicate with an external device, such as an external server, the second embodiment can be configured to communicate with the external device to accordingly acquire failure information on one candidate coil, which is located nearest to the preceding vehicle 20 in the candidate coils 21 enclosed in the determination range Ar1, and determine whether the candidate coil 21, which is located nearest to the preceding vehicle 20, is ready to perform scheduled power transmission.

The power receiving coil 35 of each embodiment, which is located under the body of the vehicle 10, can be located in any tire 43 or around any tire 43 and arranged to the lower side of the suspension mechanism of the vehicle 10.

Figure 14:
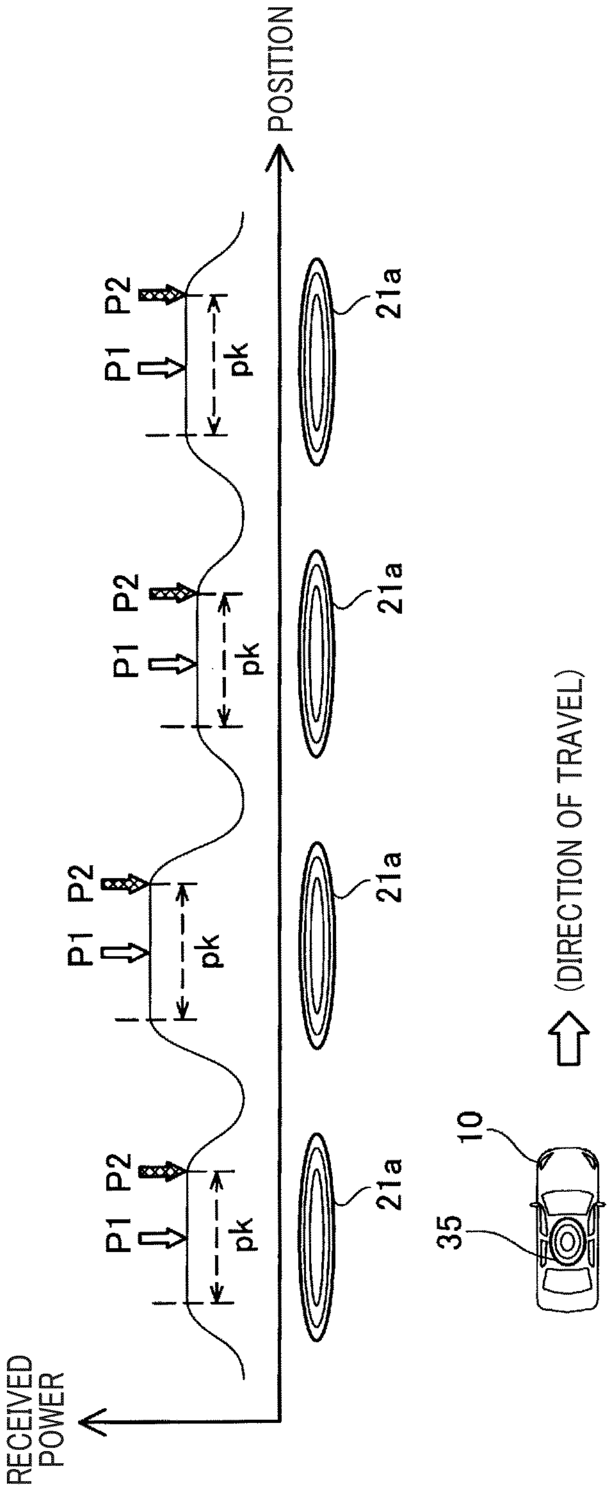
FIG. 14 is a diagram illustrating an example of a relationship between an arrangement of power transmission coils and received power according to a modification of each embodiment.

Each power transmission coil 21 of each embodiment can have a rectangular shape or an ellipsoidal shape whose longitudinal direction is along the direction of travel of the vehicle 10 in plan view. In this case, as illustrated in FIG. 14, the received power for each power transmission coil 21*a* has a local maximum level pk that is maintained as a constant value during a predetermined section of the corresponding power transmission coil 21*a* around the center of the corresponding power transmission coil 21*a* in the direction of travel of the vehicle 10. For this reason, the center of the section of each power transmission coil 21*a* can be set as a corresponding local-maximum position on the road 4. Alternatively, the start point of the section of each power transmission coil 21*a* can be set as a corresponding local-maximum position on the road 4.

The third embodiment can be configured to increase the level of sound notifying the approaching of the vehicle 10 as the vehicle 10 approaches the stop portion in addition to or in place of displaying the stop position and the current position of the vehicle 10 on the display device 300. The third embodiment can also be configured to make faster the frequency of sound notifying the approaching of the vehicle 10 as the vehicle 10 approaches the stop portion in addition to or in place of displaying the stop position and the current position of the vehicle 10 on the display device 300. Additionally, this modification of the third embodiment can be configured to significantly change the level or frequency of sound notifying the approaching of the vehicle 10 when the vehicle 10 reaches very close to the stop position, i.e., an optimum target position.

The vehicle control apparatuses 100, 100*a*, and 100*b*, their vehicle control methods, the coil position estimating apparatuses 150, and their estimating methods described in the present disclosure can be implemented by a dedicated computer including a memory and a processor programmed to perform one or more functions embodied by one or more computer programs.

The vehicle control apparatuses 100, 100*a*, and 100*b*, their vehicle control methods, the coil position estimating apparatuses 150, and their estimating methods can also be implemented by a dedicated computer including a processor comprised of one or more dedicated hardware logic circuits.

The vehicle control apparatuses 100, 100*a*, and 100*b*, their vehicle control methods, the coil position estimating apparatuses 150, and their estimating methods can further be implemented by a processor system comprised of a memory, a processor programmed to perform one or more functions embodied by one or more computer programs, and one or more hardware logic circuits.

The one or more programs can be stored in a computer-readable non-transitory storage medium as instructions to be carried out by a computer or a processor. The "computer-readable non-transitory storage medium" may include mobile storage medium, such as flexible disks and/or CD-ROMs, various internal storage devices in computers, such as various RAMs and ROMs, and/or external storage devices attachable to computers, such as hard-disk drives.

The present disclosure is not limited to the above embodiments, and can be implemented by various configurations within the scope of the present disclosure. For example, technical features included in the embodiments, which correspond to technical features included in exemplary measures described in the SUMMARY of the present disclosure, can be freely combined with each other or can be freely replaced with another feature in order to solve a part or all of the above issue and/or achieve a part or all of the above advantageous benefits. One or more of the technical features included in the above exemplary embodiment, which are not described as essential elements in the specification, can be omitted as necessity arises.

The invention claimed is:

1. A vehicle control apparatus comprising:

a power receiving apparatus to which power is wirelessly suppliable from a power transmission apparatus including one or more power transmission coils mounted to a road;

a coil position estimating apparatus for use installed in a vehicle together with the power receiving apparatus, the coil position estimating apparatus being configured to estimate a position of at least one power transmission coil, the coil position estimating apparatus comprising:

a past local-maximum position identifier configured to identify, from information indicative of how levels of first power received by the power receiving apparatus in the past change over time, at least one local maximum position along the road at which the received power became locally maximum in the past, and a power-transmission coil position estimator configured to estimate, based on the identified at least one local maximum position, at least one future local-maximum position as the position of the at least one power transmission coil, the at least one future local-maximum position corresponding to a level of second power to be received by the power receiving apparatus in a forward section of the road from the vehicle, the level of the second power being likely to become locally maximum; and a stop position determiner configured to estimate a stop position of the vehicle in accordance with the position of the at least one power transmission coil estimated by the power-transmission coil position estimator.

2. The vehicle control apparatus according to claim 1, further comprising:

a current position identifier configured to identify a current position of the vehicle; and a separation distance acquiring unit configured to acquire a separation distance between the vehicle and a preceding vehicle in front of the vehicle in a direction of travel of the vehicle, wherein:

the stop position determiner is configured to determine the stop position of the vehicle in accordance with the position of the at least one power transmission coil estimated by the power-transmission coil position estimator, the acquired separation distance, and the identified current position of the vehicle.

3. The vehicle control apparatus according to claim 2, wherein:

the power-transmission coil position estimator is configured to estimate, as the position of the at least one power transmission coil, a position of each of plurality of power transmission coils, the level of the second power to be received by the power receiving apparatus in the forward section of the road from the vehicle at the position of the corresponding one of the plurality of power transmission coils being likely to become locally maximum;

the stop position determiner is configured to:

identify, from the plurality of coils, candidate power transmission coils enclosed in a determination range;

select, from the candidate coils enclosed in the determination range, at least one power transmission coil located to be nearer to the preceding vehicle than one or more remaining candidate power transmission coils are; and determine the stop position of the vehicle in accordance with the position of the selected at least one power transmission coil;

the determination range has a front end and rear end;

the rear end of the determination range is defined to be separated from a rear end of the preceding vehicle in a rearward direction by only the sum of the separation distance and an offset distance, the offset distance being a distance from a front end of the vehicle to the power receiving coil in the direction of travel of the vehicle; and the front end of the determination range is defined to be separated from the rear end of the preceding vehicle in the rearward direction by only a predetermined distance.

4. The vehicle control apparatus according to claim 3, wherein:

the stop position determiner is configured to:

select, as the at least one power transmission coil, a nearest power transmission coil located nearest to the preceding vehicle in the candidate power transmission coils enclosed in the determination range; and determine the stop position of the vehicle in accordance with the position of the selected nearest power transmission coil.

5. The vehicle control apparatus according to claim 4, further comprising:

a determiner configured to determine whether the nearest power transmission coil is ready to perform scheduled power transmission, wherein:

the stop position determiner is configured to determine the stop position of the vehicle in accordance with the position of an adjacent candidate coil that is (i) located adjacent to the nearest power transmission coil and (ii) located closer to the vehicle than the nearest power transmission coil is upon determination that the nearest power transmission coil is not ready to perform the scheduled power transmission.

6. The vehicle control apparatus according to claim 1, further comprising:

a display controller configured to display the stop position of the vehicle and a current position of the vehicle on a display device installed in the vehicle.

7. The vehicle control apparatus according to claim 1, further comprising:

an autonomous driving controller configured to control autonomous driving of the vehicle; and a stop position notifying unit configured to notify the stop position of the vehicle determined by the stop position determiner to the autonomous driving controller.

8. The vehicle control apparatus according to claim 7, wherein:

the power-transmission coil position estimator is configured to estimate, as the position of the at least one power transmission coil, plural future local-maximum positions, each of which corresponds to the level of the second power to be received by the power receiving apparatus in the forward section of the road from the vehicle is likely to become locally maximum;

the stop position determiner is configured to:

determine, after a start of forward movement of the preceding vehicle, whether (i) a separation distance between the vehicle and a preceding vehicle in front of the vehicle in a direction of travel of the vehicle is smaller than or equal to a predetermined distance and (ii) one of the plural future local-maximum positions is located in a forward direction of the vehicle being stopped and in a rear of the preceding vehicle; and determine a new stop position of the vehicle in accordance with the position of the one of the plural future local-maximum positions.

9. The vehicle control apparatus according to claim 8, wherein:

the autonomous driving controller is configured to:

maintain, after the vehicle being stopped, a stopped state of the vehicle until, after the start of the forward movement of the preceding vehicle, the new stop position is notified thereto from the stop position determiner; and cause the vehicle to start traveling in the forward direction in response to receiving of the new stop position.

10. The vehicle control apparatus according to claim 8, further comprising:

a display controller configured to control a display device installed in the vehicle, wherein:

the stop position informing unit is configured to inform the display controller of the new stop position of the vehicle determined by the stop position determiner; and the display controller is configured to display the new stop position of the vehicle and a current position of the vehicle on the display device.

* * * * *